(12) United States Patent
Govindasamy et al.

(10) Patent No.: US 9,087,019 B2
(45) Date of Patent: Jul. 21, 2015

(54) DISK STORAGE SYSTEM WITH REBUILD SEQUENCE AND METHOD OF OPERATION THEREOF

(75) Inventors: Raghuraman Govindasamy, San Jose, CA (US); Mohan B. Rowlands, Union City, CA (US); Ganesh Kumar, San Jose, CA (US)

(73) Assignee: Promise Technology, Inc., Milpitas, CA (US)

( * ) Notice: Subject to any disclaimer, the term of this patent is extended or adjusted under 35 U.S.C. 154(b) by 251 days.

(21) Appl. No.: 13/360,636

(22) Filed: Jan. 27, 2012

(65) Prior Publication Data

US 2013/0198563 A1    Aug. 1, 2013

(51) Int. Cl.
*G06F 11/00* (2006.01)
*G06F 11/16* (2006.01)
*G06F 11/20* (2006.01)
*G06F 11/10* (2006.01)

(52) U.S. Cl.
CPC ........ *G06F 11/1662* (2013.01); *G06F 11/1092* (2013.01); *G06F 11/2082* (2013.01); *G06F 11/2094* (2013.01)

(58) Field of Classification Search
CPC ............ G06F 11/1076; G06F 11/1084; G06F 11/1088; G06F 11/1092; G06F 11/1479; G06F 11/1497
USPC ........ 714/6.1, 6.2, 6.21, 6.22, 6.24, 6.3, 6.32; 711/114
See application file for complete search history.

(56) References Cited

U.S. PATENT DOCUMENTS

| | | | |
|---|---|---|---|
| 5,822,584 A * | 10/1998 | Thompson et al. | 718/103 |
| 5,948,110 A * | 9/1999 | Hitz et al. | 714/6.22 |
| 6,549,977 B1 * | 4/2003 | Horst et al. | 711/113 |
| 7,143,308 B2 * | 11/2006 | Tseng et al. | 714/6.22 |
| 7,249,277 B2 * | 7/2007 | Arai et al. | 714/6.21 |
| 7,389,379 B1 * | 6/2008 | Goel et al. | 711/112 |
| 7,624,300 B2 * | 11/2009 | Manning et al. | 714/6.32 |
| 7,908,526 B2 | 3/2011 | Guha | |
| 7,930,473 B2 | 4/2011 | Rajan et al. | |
| 7,941,693 B2 | 5/2011 | Kano et al. | |
| 7,962,779 B2 | 6/2011 | Patel et al. | |
| 7,975,168 B2 | 7/2011 | Morita et al. | |
| 7,975,173 B2 | 7/2011 | Callaway et al. | |
| 8,065,481 B1 * | 11/2011 | Hiller et al. | 711/114 |
| 8,082,390 B1 * | 12/2011 | Fan et al. | 711/114 |
| 2005/0278476 A1 * | 12/2005 | Teske et al. | 711/100 |
| 2009/0013213 A1 * | 1/2009 | Kalman et al. | 714/20 |
| 2009/0172273 A1 * | 7/2009 | Piszczek et al. | 711/114 |
| 2009/0271659 A1 * | 10/2009 | Troppens et al. | 714/7 |
| 2009/0300282 A1 * | 12/2009 | Rowlands | 711/114 |
| 2009/0313617 A1 * | 12/2009 | Hung | 717/168 |
| 2012/0084600 A1 * | 4/2012 | Kidney et al. | 714/6.13 |
| 2013/0024723 A1 * | 1/2013 | Govindasamy | 714/6.22 |

* cited by examiner

*Primary Examiner* — Scott Baderman
*Assistant Examiner* — Joseph Kudirka
(74) *Attorney, Agent, or Firm* — Ishimaru & Associates LLP

(57) ABSTRACT

A method of operation of a disk storage system includes: providing a disk storage controller; coupling a first physical disk to the disk storage controller; detecting a failure of the first physical disk; and rebuilding a first logical drive, after replacing the first physical disk, includes: selecting a selected stripe of the first logical drive, reading a selected stripe status of the selected stripe, and marking the selected stripe as on-line in the selected stripe status.

20 Claims, 3 Drawing Sheets

DISK STORAGE SYSTEM WITH REBUILD SEQUENCE AND METHOD OF OPERATION THEREOF

TECHNICAL FIELD

The present invention relates generally to a disk storage system, and more particularly to a system for managing a system having multiple disks in storage apparatus.

BACKGROUND ART

Conventional disk array data storage systems have multiple disk storage devices that are arranged and coordinated to form a single mass storage system. A Redundant Array of Independent Disks (RAID) system is an organization of data in an array of mass data storage devices, such as hard disk drives, to achieve varying levels of data availability and system performance.

RAID systems typically designate part of the physical storage capacity in the array to store redundant data, either mirror or parity. The redundant information enables regeneration of user data in the event that one or more of the array's member disks, components, or the access paths to the disk(s) fail.

In the event of a disk or component failure, redundant data is retrieved from the operable portion of the system and used to regenerate or rebuild the original data that is lost due to the component or disk failure. This aspect is exacerbated by the increased capacity of the physical drives. Restoring larger physical disks obviously takes longer, which increases the probability of a second failure during the rebuild process.

Accordingly, to minimize the probability of data loss during a rebuild in a hierarchical RAID system, there is a need to manage data recovery and rebuild that accounts for data availability characteristics of the hierarchical RAID levels employed. While a data recovery process is taking place, any additional failure would result in loss of the original user data making an efficient rebuild sequence imperative.

Thus, a need still remains for a disk storage system with rebuild sequence. In view of the overwhelming reliance on database availability, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a disk storage system including: providing a disk storage controller; coupling a first physical disk to the disk storage controller; detecting a failure of the first physical disk; and rebuilding a first logical drive, after replacing the first physical disk, including: selecting a selected stripe of the first logical drive, detecting a selected stripe status of the selected stripe, and marking the selected stripe as on-line in the selected stripe status.

The present invention provides a disk storage system, including: a disk storage controller; a first physical disk coupled to the disk storage controller; a first logical drive, on the first physical disk, restored includes: a selected stripe of the first logical drive marked as on-line, and a non-volatile memory, coupled to the disk storage controller, includes a selected stripe status of the selected stripe; and a rebuilt drive marked on-line includes only written stripes regenerated.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
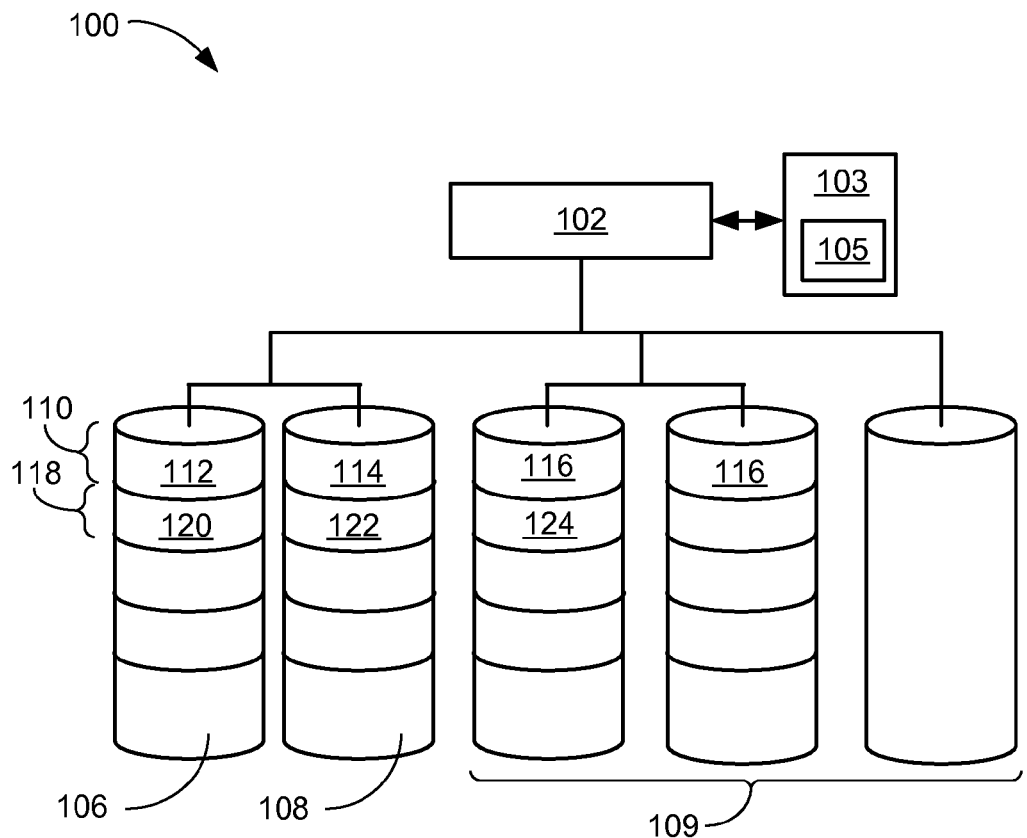
FIG. 1 is a block diagram of a disk storage system in an embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it will be apparent that the invention can be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

For expository purposes, the term "horizontal" as used herein is defined as a plane parallel to the plane or surface of the disk drive, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures.

Typically, the disk drives are allocated into equally sized address areas referred to as "blocks." A set of blocks that has the same unit address ranges from each of the physical disks is referred to as a "stripe" or "stripe set." The terms "coupling" and "de-coupling" is defined as inserting and removing a storage tray containing one or more disk drives from a storage enclosure supporting a redundant array of independent disks. The insertion causes the electrical and physical connection between the disk drives and the storage enclosure, which includes a disk storage controller known as a RAID controller.

Referring now to FIG. 1, therein is shown a block diagram of a disk storage system 100, in an embodiment of the present invention. The block diagram of the disk storage system 100 depicts a disk storage controller 102, having a non-volatile memory 103, connected to a first physical disk 106, a second physical disk 108, or a combination thereof. The non-volatile memory 103, such as a flash memory, is used to store configuration information and process related information.

The disk storage controller 102 can configure the first physical disk 106 and the second physical disk 108 as well as additional physical disks 109 by reading a serial number of the first physical disk 106 and the second physical disk 108 and allocating space for them in the non-volatile memory 103. It is understood that the invention is not limited to the first physical disk 106 and the second physical disk 108. Any number of the physical disks can be used, but in order to clarify the description only two of the physical disks are discussed.

The first physical disk 106, the second physical disk 108, and the additional physical disks 109 can be configured as a redundant array of independent disks (RAID) to include a first logical drive 110, such as a Logical Unit Number (LUN). The first logical drive 110 can be formed by a first group of allocated sectors 112 on the first physical disk 106, a second group of allocated sectors 114 on the second physical disk 108. The first logical drive 110 can also include additional groups of allocated sectors 116 in the additional physical disks 109. It is understood that the first logical drive 110 of a RAID must be written on more than the first physical disk 106 and can be written on any number of the physical disks in the disk storage system 100.

The collective allocated sectors of the first logical drive 110 can be accessed through the disk storage controller 102 as a LUN. A second logical drive 118 can be formed by a third group of allocated sectors 120 on the first physical disk 106, a fourth group of allocated sectors 122 on the second physical disk 108. The second logical drive 118 can also include other allocated sectors 124 on other of the additional physical disks 109. Each of the logical unit numbers, such as the first logical drive 110 and the second logical drive 118, can be accessed independently by a host system (not shown) through the disk storage controller 102.

In normal operation, the disk storage controller 102 would write data to and read data from the first logical drive 110 and the second logical drive 118. The operation is hidden from the host system, which is unaware of the first physical disk 106, the second physical disk 108, or the additional physical disks 109 contained within the disk storage system 100.

In the operation of the disk storage system 100, if a data error is detected while reading the first logical drive 110 the error can be corrected without notification being sent to the host system. If, during normal operation of the disk storage system 100, a failure occurs in the first physical disk 106, the first physical disk 106 can be de-coupled from the disk storage controller 102 in order to replace the first physical disk 106.

The non-volatile memory 103 is written to indicate the first physical disk 106 is a failed drive 106. The non-volatile memory 103 can contain a selected stripe status 105, which contains a current copy of the stripe status for all the stripes of the first logical drive 110 and the second logical drive 118. The selected stripe status 105 is defined as a segment of the non-volatile memory 103, which contains a series of status bits for each stripe in any of the logical drives. The selected stripe status 105 can include the stripe status of consistent/ inconsistent, written, and on-line/critical. The selected stripe status 105 can be used during the rebuild process of the first logical drive 110.

The failure of the first physical disk 106, which is detected by the disk storage controller 102, can be a data error, a command time-out, loss of power, or any malfunction that prevents the execution of pending or new commands. It is understood that the detection of the failed drive 106 can be in any location of the storage enclosure (not shown).

Upon replacing the first physical disk 106 to the disk storage system 100, a process is entered to rebuild the data content of the first group of allocated sectors 112 on the first logical drive 110 and the third group of allocated sectors 120 on the second logical drive 118 that collectively reside on the first physical disk 106. While the first physical disk 106 is removed from the disk storage system 100, any data read from the second group of allocated sectors 114 or the fourth group of allocated sectors 122 on the second physical disk 108 can be regenerated through a mirror or parity correction process.

The dramatic increase in the storage capacity of the first physical disk 106 and the second physical disk 108 has increased the amount of time required to rebuild any lost data on a newly installed unit of the first physical disk 106. It is required that an efficient and rapid rebuild of the data is executed to prevent any data loss in the disk storage system 100 due to a second failure that might occur prior to the complete restoration of the data.

It has been discovered that the first physical disk 106 comes back on-line, in approximately 10 to 25 percent of the duration as compared to rebuilding the entire drive, by rebuilding only the stripes that have been written. The data on the stripe (s) that were not written, are correctable through the parity structure without degradation in read performance. The overall time required to restore the first physical disk 106 to an on-line status is therefore substantially reduced. The total resource of the disk storage system 100 can then be applied to the background operation of restoring the data to the first physical disk 106, which has been replaced. It is also understood that the operation of the disk storage system 100 continues during the failure and rebuilding of the first physical disk 106.

Figure 2:
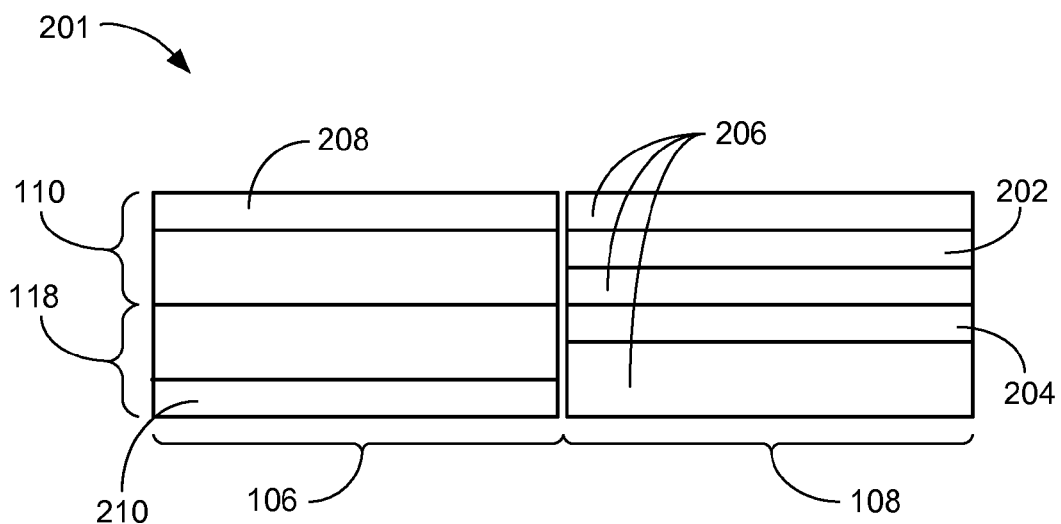
FIG. 2 is a functional block diagram of a restoration process of the disk storage system.

Referring now to FIG. 2, therein is shown a functional block diagram of a restoration process 201 of the disk storage system 100. The functional block diagram of the restoration process 201 depicts the first physical disk 106, which can have been replaced due to a previous failure. The entirety of the first logical drive 110 and the second logical drive 118 on the first physical disk 106 must be restored.

In order to facilitate the disk storage system 100 of the present invention, the first logical drive 110 and the second logical drive 118 can be split into many small stripes and the status of the each stripe can be maintained in the selected stripe status 105, of FIG. 1, of the non-volatile memory 103, of FIG. 1. The selected stripe status 105 can be set to indicate the stripe is consistent, written, online, critical, or degraded. The selected stripe status 105 can be maintained in the non-volatile memory 103 to record the write log for every stripe in the first logical drive 110 and the second logical drive 118. The table can include 1 bit per status condition for each stripe and each stripe to have a maximum of 1 GB physical capacity.

When the first physical disk 106 is once again available for operation, after the replacement of the first physical disk 106, a selective restoration of the data can be performed. The selective restoration of the data means initially regenerating the data for only first written stripes 202, marking the first physical disk 106 as on-line, and performing a background synchronization of the rest of the first physical disk 106. The first written stripe 202 is a segment of data within the first logical drive 110 that can be restored in the second physical disk 108. A subsequent written stripe 204, within the second logical drive 118, can be restored before the second physical disk 108 can be fully put on-line by the disk storage controller 102, of FIG. 1.

It is understood that the first written stripe 202, while found in the first logical drive 110, can be written on the first physical disk 106, the second physical disk 108, any of the additional physical disks 109, or a combination thereof. By way of an example, the first written stripe 202 is shown only on the good drive 108 and not on the failed drive 106.

Un-written stripes 206 can be located in the first logical drive 110 and the second logical drive 118. A selected stripe 208 of the first logical drive 110 can be among the un-written stripes 206 or it can be among the subsequent written stripe 204. The disk storage controller 102 can read the selected stripe status 105 from the non-volatile memory 103 in order to determine whether the selected stripe 208 has been a target of a write operation.

A second selected stripe 210 can be configured on the first physical disk 106 as a portion of the second logical drive 118. During the rebuild of the content of the first physical disk 106, all of the selected stripe from the first logical drive 110 and the second selected stripe 210 from the second logical drive 118 must be restored.

It is understood that the position of the un-written stripes 206 is an example only and the first logical drive 110, the second logical drive 118, or a combination thereof can contain the un-written stripes 206 in any location. It is further understood that the first written stripe 202 and the subsequent written stripe 204 are an example only and any number of the stripes in the first logical drive 110 and the second logical drive 118 can have been written while the first physical disk 106 was unavailable from the disk storage system 100.

During the initialization of the disk storage system 100, the disk storage controller 102 will record the serial numbers of the first physical disk 106, the second physical disk 108 and the additional physical disks 109. The serial number of each of the first physical disk 106 and the second physical disk 108 will be checked when a failed physical disk is removed and replaced. The disk storage controller 102 is aware that the first physical disk 106 has experienced a failure and when it is replaced.

It has been discovered that by dividing the physical disk drive capacity into many small stripes and maintaining the status of the stripes individually, a logical drive can be returned to on-line status by restoring the stripes that had been written to between the failure of the physical disk drive and the beginning of the logical drive rebuild. The resulting efficiencies can reduce the time required to restore the logical drive to operation in the disk storage system.

Thus, it has been discovered that the disk storage system and device of the present invention furnishes important and heretofore unknown and unavailable solutions, capabilities, and functional aspects for maintaining disk storage systems in a RAID configuration.

Figure 3:
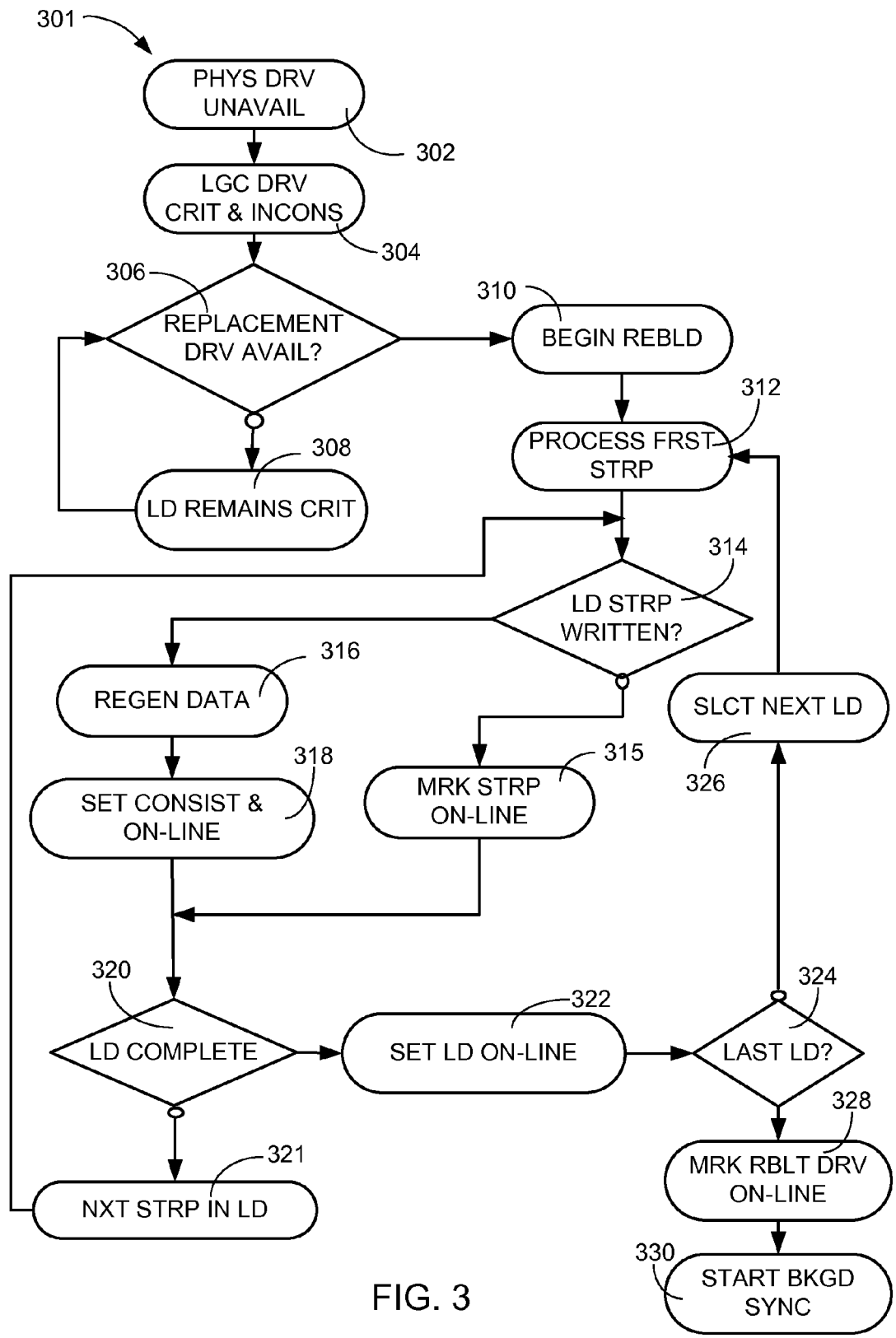
FIG. 3 is a flow chart of a logical drive rebuild of the disk storage system.

Referring now to FIG. 3, therein is shown a flow chart of a logical drive rebuild 301 of the disk storage system. The flow chart of the logical drive rebuild 301 depicts the series of events that are representative of the present invention. The logical drive rebuild 301 is initiated in a physical drive unavailable block 302. This block indicates the first physical disk 106, of FIG. 1, or the second physical disk 108, of FIG. 1, has failed to operate correctly.

The inoperative state of the first physical disk 106 or the second physical disk 108 causes the first logical drive 110, of FIG. 1, and the second logical drive 118, of FIG. 1, to be set to a critical degraded state but still available for full operation. A fault status block 304 can indicate that the first logical drive 110 and the second logical drive 118 are in a critical and inconsistent state. The entry into this state will cause the disk storage controller 102, of FIG. 1, to set an alarm indicating that intervention is required.

A replacement drive available block 306 will determine if a pre-allocated spare of the first physical disk 106 is available or the failed physical disk has been replaced with a new and operational physical disk. If it is determined that no such replacement physical disk is available, the flow proceeds to a remain critical block 308 and immediately returns to the replacement drive available block 306 to monitor the availability of the replacement physical disk. When the replacement physical disk is available the disk storage controller 102 can set disk rebuilding status in the non-volatile memory 103, of FIG. 1, and the flow proceeds to a begin rebuild block 310.

The begin rebuild block 310 can identify the serial number of the replacement physical disk and update the stored information in order to replace the first physical disk 106 within the disk storage system 100. The flow then proceeds to a process first stripe block 312. In the process first stripe block 312, the stripes of the first logical drive 110 can be checked to determine if a write operation had taken place to the first stripe of the first logical drive 110.

It is understood that the failure of the first physical disk 106 is an example only and any of the physical disks within the disk storage system 100 can fail. It is a further example that some of the stripes of the first logical drive 110 are present on the physical disk that failed. The process of rebuilding the content of the first logical drive 110 can be replicated for any of the logical drives that can utilize the capacity of the physical disk that failed.

The flow then proceeds to a logical drive stripe written check 314. The status of the selected stripe will indicate whether it has been the target of a write operation between the initial creation of the first logical drive 110 and the time of the logical drive stripe written check 314. If there was no write operation that addressed the selected stripe the flow proceeds to a mark stripe on-line block 315. The status of the selected stripe will remain on-line and inconsistent, which indicates that the data will be restored by a background synchronization operation.

If the logical drive stripe written check 314 determines that the selected stripe was the target of the write operation, the flow proceeds to a regenerate stripe data block 316. The data that would have been written to the stripe, had the physical disk not failed, is regenerated and written to the selected stripe of the first logical drive 110. The flow then proceeds to a set consistent and on-line block 318, where the status of the selected stripe is altered form critical and inconsistent to consistent and on-line. The consistent and on-line status for the selected stripe means that the content of the selected stripe is up-to-date and available on-line.

A logical drive complete check 320 is the destination of both the mark stripe on-line block 315 and the set consistent and on-line block 318. The entry to the logical drive complete check 320 means that the selected stripe is consistent and available on-line. If no write command had targeted the selected stripe, the data cannot be written into the replacement physical disk but can be regenerated automatically for a read of the first logical drive 110.

If the logical drive complete check 320 determines that the first logical drive 110 includes additional stripes on the first physical disk 106, the flow proceeds to a select next stripe block 321. The select next stripe block 321 accesses the next stripe in the first logical drive 110 and the flow then returns to the logical drive stripe written check 314 in order to process the selected stripe.

If the logical drive complete check 320 determines that all of the stripes of the first logical drive 110 have been addressed and are now in an on-line state, the flow proceeds to a set logical block on-line 322. The set logical block on-line 322 updates the status of the first logical drive 110 to indicate that it is operational and ready for any further transactions. The flow then proceeds to a last logical drive check 324.

The last logical drive check 324 monitors the status of all of the logical drives that are mapped to the first physical disk 106. If other logical drives, such as the second logical drive 118, are also mapped to the first physical disk 106, the flow will proceed to a select next logical drive block 326 in order to enable processing any remaining logical drives that must be addressed. As an example, if the second logical drive 118 is mapped to the first physical disk 106, the second logical drive 118 would be selected. The flow would then proceed to the process first stripe block 312 in order to execute the rebuild process on the second logical drive 118.

If the last logical drive check 324 determines that all of the logical drives that are mapped to the first physical disk 106 have been addressed, the flow proceeds to a mark rebuilt drive on-line 328. At this point, only the stripes that were written after creation of the first logical drive 110 will be updated. The first physical disk 106 is marked as being on-line, but only the stripes that have been rebuilt are indicated to be consistent. This differentiation between the stripes, allows the access of the first physical disk 106 to commence. If a stripe that is inconsistent is accessed, its data is automatically regenerated by an exclusive-or process performed by the disk storage controller 102 or its peripheral hardware. In the case of a write operation to a stripe that is marked as inconsistent, once the write is complete the stripe is updated to consistent.

The flow then proceeds to a background synchronization 330. The background synchronization 330 steps through the stripes that are flagged as inconsistent in order to regenerate the data, write the stripe, and update the status to be on-line and consistent. While the background synchronization 330 can take an extended amount of time to complete, the normal operation of the disk storage system 100 is not delayed. This is extremely significant as the capacity of the first physical disk 106 dramatically increases and the time required for completing the background synchronization 330 increases.

Figure 4:
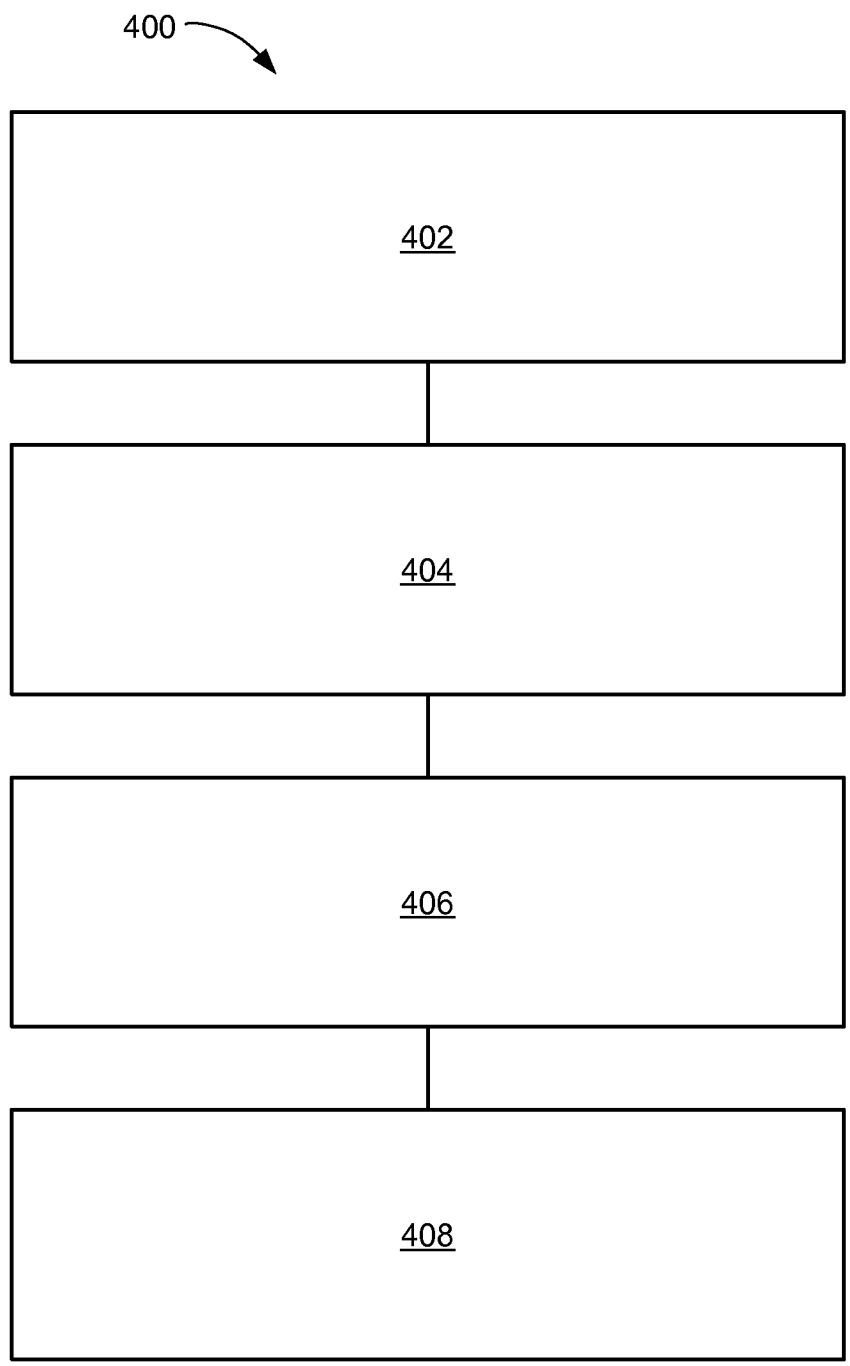
FIG. 4 is a flow chart of a method of operation of a disk storage system in a further embodiment of the present invention.

Referring now to FIG. 4, therein is shown a flow chart of a method 400 of operation of the disk storage system 100 in a further embodiment of the present invention. The method 400 includes: providing a disk storage controller in a block 402; coupling a first physical disk to the disk storage controller in a block 404; detecting a failure of the first physical disk in a block 406; and rebuilding a first logical drive, after replacing the first physical disk, including: selecting a selected stripe of the first logical drive, detecting a selected stripe status of the selected stripe, and marking the selected stripe as on-line in the selected stripe status in a block 408.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a disk storage system comprising:
providing a disk storage controller;
coupling a first physical disk, having a first serial number, to the disk storage controller;
detecting a failure of the first physical disk;
replacing the first physical disk including detecting a second serial number of a replacement physical disk; and
rebuilding a first logical drive, on the replacement physical disk, including:
selecting a selected stripe of the first logical drive,
detecting a selected stripe status of the selected stripe,
restoring only a portion of the selected stripe, on the replacement physical disk, that is a target of a write operation based on the selected stripe status,
marking the selected stripe as on-line and inconsistent in the selected stripe status, and
restoring all inconsistent data, of the first logical drive, in a background synchronization.

2. The method as claimed in claim 1 further comprising partitioning a second logical drive on the first physical disk.

3. The method as claimed in claim 1 further comprising reading a non-volatile memory, having the selected stripe status, by the disk storage controller.

4. The method as claimed in claim 1 wherein rebuilding the first logical drive includes:
regenerating stripe data for the selected stripe; and
updating a consistent bit and an on-line bit in the selected stripe status.

5. The method as claimed in claim 1 wherein replacing the first physical disk includes:
setting an on-line status for the first logical drive; and
rebuilding a second logical drive including checking a second selected stripe on the first physical disk.

6. A method of operation of a disk storage system comprising:
providing a disk storage controller having a non-volatile memory;
coupling a first physical disk, having a first serial number, to the disk storage controller;
detecting a failure of the first physical disk;
replacing the first physical disk including detecting a second serial number of a replacement physical disk; and
rebuilding a first logical drive, on the replacement physical disk, including:
setting a disk rebuilding status in the non-volatile memory,
selecting a selected stripe of the first logical drive,
detecting a selected stripe status of the selected stripe,
restoring only a portion of the selected stripe, on the replacement physical disk, that is a target of a write operation based on the selected stripe status,
marking the selected stripe as on-line in the selected stripe status, and restoring remaining inconsistent data, of the first logical drive, in a background synchronization.

7. The method as claimed in claim 6 further comprising partitioning a second logical drive on the first physical disk including accessing a second selected stripe on the first physical disk.

8. The method as claimed in claim 6 further comprising reading a written bit from the non-volatile memory, having the selected stripe status, by the disk storage controller for detecting the selected stripe status having a written bit.

9. The method as claimed in claim 6 wherein rebuilding the first logical drive includes:
   regenerating stripe data for the selected stripe;
   updating a consistent bit and an on-line bit in the selected stripe status; and
   wherein restoring the data, of the first logical drive, includes completing the background synchronization of the first physical disk.

10. The method as claimed in claim 6 wherein replacing the first physical disk includes:
    setting an on-line status for the first logical drive;
    rebuilding a second logical drive including checking a second selected stripe on the first physical disk; and
    entering a mark rebuilt drive on-line for the first physical disk.

11. A disk storage system comprising:
    a disk storage controller;
    a first physical disk, having a first serial number, coupled to the disk storage controller;
    a first logical drive, on the first physical disk, restored including:
    a selected stripe of the first logical drive marked as on-line, and
    a non-volatile memory, coupled to the disk storage controller, which includes a selected stripe status of the selected stripe; and
    a rebuilt drive, having a second serial number of a replacement physical disk, rebuilt by:
    a portion of the selected stripe including data that is a target of a write operation restored,
    the replacement physical disk marked as on-line and inconsistent which includes only written stripes regenerated, and
    remaining data, of the first logical drive, restored in a background synchronization during use.

12. The system as claimed in claim 11 further comprising a second logical drive configured on the first physical disk.

13. The system as claimed in claim 11 further comprising a first written stripe of the first physical disk detected by the disk storage controller.

14. The system as claimed in claim 11 wherein the first logical drive is restored by:
    stripe data regenerated for the selected stripe; and
    a consistent bit and an on-line bit set in the selected stripe status.

15. The system as claimed in claim 11 wherein the first physical disk is restored by a second logical drive with a second selected stripe written on the first physical disk.

16. The system as claimed in claim 11 wherein:
    the disk storage controller is configured to detect the first physical disk has failed; and
    the first logical drive, marked as on-line without all the selected stripes written.

17. The system as claimed in claim 16 further comprising a second logical drive configured on the first physical disk which includes a second selected stripe on the first physical disk.

18. The system as claimed in claim 16 further comprising a first written stripe of the first physical disk detected by the disk storage controller which includes stripe data regenerated.

19. The system as claimed in claim 16 wherein the first logical drive is restored by:
    stripe data regenerated for the selected stripe; and
    a consistent bit and an on-line bit set in the selected stripe status.

20. The system as claimed in claim 16 wherein the first physical disk is marked as rebuilt with the selected stripe unwritten.

\* \* \* \* \*